US010078819B2

(12) United States Patent
Bonforte

(10) Patent No.: US 10,078,819 B2
(45) Date of Patent: Sep. 18, 2018

(54) PRESENTING FAVORITE CONTACTS INFORMATION TO A USER OF A COMPUTING DEVICE

(75) Inventor: Jeffrey Bonforte, San Francisco, CA (US)

(73) Assignee: OATH INC., New York, NY (US)

( * ) Notice: Subject to any disclaimer, the term of this patent is extended or adjusted under 35 U.S.C. 154(b) by 7 days.

(21) Appl. No.: 13/528,697

(22) Filed: Jun. 20, 2012

(65) Prior Publication Data

US 2012/0331418 A1    Dec. 27, 2012

Related U.S. Application Data

(60) Provisional application No. 61/499,652, filed on Jun. 21, 2011.

(51) Int. Cl.
*G06F 3/00*    (2006.01)
*G06Q 10/10*    (2012.01)
(Continued)

(52) U.S. Cl.
CPC ......... *G06Q 10/107* (2013.01); *G06F 3/0481* (2013.01); *G06Q 50/01* (2013.01); *G06F 3/0482* (2013.01)

(58) Field of Classification Search
CPC ............................ G06F 3/0481; G06F 3/0482
(Continued)

(56) References Cited

U.S. PATENT DOCUMENTS

| 5,396,647 | A | 3/1995 | Thompson et al. |
| 5,610,915 | A | 3/1997 | Elliott et al. |
| 5,966,714 | A | 10/1999 | Huang et al. |
| 6,020,884 | A | 2/2000 | MacNaughton et al. |

(Continued)

FOREIGN PATENT DOCUMENTS

| CN | 101351818 | 1/2009 |
| EP | 0944002 | 9/1999 |
| EP | 944002 | 9/1999 |
| JP | 2003006116 | 1/2003 |

(Continued)

OTHER PUBLICATIONS

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

(Continued)

*Primary Examiner* — Kieu Vu
*Assistant Examiner* — Andrew Chung
(74) *Attorney, Agent, or Firm* — James J. DeCarlo; Greenberg Traurig, LLP

(57) ABSTRACT

Systems and methods to present information to a user regarding favorite contacts of the user. In one embodiment, a method includes: storing a plurality of person profiles for persons referenced in communications received by a user of a computing device; selecting, using at least one processor, a set of contacts from the plurality of person profiles based on a relevancy ranking, wherein the set of contacts is selected for display to the user on the computing device; and organizing, using the at least one processor, the set of contacts into at least two time groups, each time group associated with a different time period, wherein contacts will be displayed to the user within each time group based on a relevancy ranking for each contact within the time group.

15 Claims, 3 Drawing Sheets

(51) Int. Cl.
*G06F 3/0481* (2013.01)
*G06Q 50/00* (2012.01)
*G06F 3/0482* (2013.01)

(58) Field of Classification Search
USPC .......................................................... 715/716
See application file for complete search history.

(56) References Cited

U.S. PATENT DOCUMENTS

| | | | |
|---|---|---|---|
| 6,285,999 B1 | 9/2001 | Page | |
| 6,385,644 B1 | 5/2002 | Devine et al. | |
| 6,405,197 B2 | 6/2002 | Gilmour | |
| 6,484,196 B1 | 11/2002 | Maurille | |
| 6,510,453 B1 | 1/2003 | Apfel et al. | |
| 6,560,620 B1 | 5/2003 | Ching | |
| 6,594,654 B1 | 7/2003 | Salam et al. | |
| 6,615,348 B1 | 9/2003 | Gibbs | |
| 6,714,967 B1 | 3/2004 | Horvitz | |
| 6,721,748 B1 | 4/2004 | Knight et al. | |
| 6,816,850 B2 | 11/2004 | Culliss | |
| 6,832,245 B1 | 12/2004 | Isaacs et al. | |
| 6,931,419 B1 | 8/2005 | Lindquist | |
| 6,952,805 B1 | 10/2005 | Tafoya et al. | |
| 6,965,918 B1 | 11/2005 | Arnold et al. | |
| 6,996,777 B2 | 2/2006 | Hipakka | |
| 7,003,724 B2 | 2/2006 | Newman | |
| 7,058,892 B1 | 6/2006 | MacNaughton et al. | |
| 7,076,533 B1 | 7/2006 | Knox et al. | |
| 7,085,745 B2 | 8/2006 | Klug | |
| 7,103,806 B1 | 9/2006 | Horvitz | |
| 7,181,518 B1 | 2/2007 | Matsumoto et al. | |
| 7,185,065 B1 | 2/2007 | Holtzman et al. | |
| 7,246,045 B1 | 7/2007 | Rappaport et al. | |
| 7,289,614 B1 * | 10/2007 | Twerdahl et al. | 379/142.01 |
| 7,328,242 B1 | 2/2008 | McCarthy et al. | |
| 7,333,976 B1 | 2/2008 | Auerbach et al. | |
| 7,359,894 B1 | 4/2008 | Liebman et al. | |
| 7,383,307 B2 | 6/2008 | Kirkland et al. | |
| 7,444,323 B2 | 10/2008 | Martinez et al. | |
| 7,454,464 B2 | 11/2008 | Puthenkulam et al. | |
| 7,475,109 B1 | 1/2009 | Fletcher et al. | |
| 7,475,113 B2 | 1/2009 | Markus | |
| 7,512,788 B2 | 3/2009 | Choi et al. | |
| 7,512,814 B2 | 3/2009 | Chen et al. | |
| 7,536,384 B2 | 5/2009 | Venkataraman et al. | |
| 7,539,676 B2 * | 5/2009 | Aravamudan et al. | |
| 7,580,363 B2 | 8/2009 | Sorvari et al. | |
| 7,593,995 B1 | 9/2009 | He et al. | |
| 7,606,860 B2 | 10/2009 | Puthenkulam et al. | |
| 7,620,407 B1 | 11/2009 | Donald et al. | |
| 7,624,103 B2 | 11/2009 | Wiegering et al. | |
| 7,627,598 B1 | 12/2009 | Burke | |
| 7,634,463 B1 | 12/2009 | Katragadda et al. | |
| 7,639,157 B1 | 12/2009 | Whitley et al. | |
| 7,653,695 B2 | 1/2010 | Flury et al. | |
| 7,685,144 B1 | 3/2010 | Katragadda | |
| 7,692,653 B1 | 4/2010 | Petro et al. | |
| 7,698,140 B2 | 4/2010 | Bhardwaj et al. | |
| 7,702,730 B2 | 4/2010 | Spataro et al. | |
| 7,707,249 B2 | 4/2010 | Spataro et al. | |
| 7,707,509 B2 | 4/2010 | Naono et al. | |
| 7,716,140 B1 | 5/2010 | Nielsen et al. | |
| 7,720,916 B2 | 5/2010 | Fisher et al. | |
| 7,724,878 B2 | 5/2010 | Timmins et al. | |
| 7,725,492 B2 | 5/2010 | Sittig | |
| 7,743,051 B1 | 6/2010 | Kashyap et al. | |
| 7,752,081 B2 | 7/2010 | Calabria | |
| 7,756,895 B1 | 7/2010 | Emigh | |
| 7,756,935 B2 | 7/2010 | Gaucas | |
| 7,761,436 B2 | 7/2010 | Norton et al. | |
| 7,788,260 B2 | 8/2010 | Lunt | |
| 7,805,492 B1 | 9/2010 | Thatcher et al. | |
| 7,818,396 B2 | 10/2010 | Dolin et al. | |
| 7,827,208 B2 | 11/2010 | Bosworth | |
| 7,827,265 B2 | 11/2010 | Cheever et al. | |
| 7,831,692 B2 | 11/2010 | French et al. | |
| 7,836,045 B2 | 11/2010 | Schachter | |
| 7,836,134 B2 | 11/2010 | Pantalone | |
| 7,849,141 B1 | 12/2010 | Bellegarda et al. | |
| 7,849,142 B2 | 12/2010 | Clegg et al. | |
| 7,853,602 B2 | 12/2010 | Gorti et al. | |
| 7,853,881 B1 | 12/2010 | Aly Assal et al. | |
| 7,865,562 B2 | 1/2011 | Nesbitt et al. | |
| 7,870,197 B2 | 1/2011 | Lewis et al. | |
| 7,899,806 B2 | 3/2011 | Aravamudan | |
| 7,899,871 B1 | 3/2011 | Kumar et al. | |
| 7,908,647 B1 | 3/2011 | Polis et al. | |
| 7,925,690 B2 * | 4/2011 | Smith et al. | 709/203 |
| 7,930,430 B2 | 4/2011 | Thatcher et al. | |
| 7,949,611 B1 | 5/2011 | Nielsen et al. | |
| 7,949,627 B2 | 5/2011 | Aravamudan | |
| 7,970,832 B2 | 6/2011 | Perry, Jr. et al. | |
| 7,979,569 B2 | 7/2011 | Eisner et al. | |
| 7,991,764 B2 | 8/2011 | Rathod | |
| 7,996,456 B2 | 8/2011 | Gross | |
| 8,005,806 B2 | 8/2011 | Rupp et al. | |
| 8,032,598 B1 | 10/2011 | He et al. | |
| 8,055,715 B2 | 11/2011 | Bensky et al. | |
| 8,073,928 B2 | 12/2011 | Dolin et al. | |
| 8,086,676 B2 | 12/2011 | Palahnuk et al. | |
| 8,086,968 B2 | 12/2011 | McCaffrey et al. | |
| 8,112,437 B1 | 2/2012 | Katragadda et al. | |
| 8,140,566 B2 | 3/2012 | Boerries et al. | |
| 8,145,791 B2 | 3/2012 | Thatcher et al. | |
| 8,151,358 B1 | 4/2012 | Herold | |
| 8,161,122 B2 | 4/2012 | Sood et al. | |
| 8,200,761 B1 | 6/2012 | Tevanian | |
| 8,200,808 B2 | 6/2012 | Ishida | |
| 8,204,897 B1 | 6/2012 | Djabarov et al. | |
| 8,239,197 B2 | 8/2012 | Webb et al. | |
| 8,244,848 B1 | 8/2012 | Narayanan et al. | |
| 8,271,025 B2 | 9/2012 | Brisebois et al. | |
| 8,284,783 B1 | 10/2012 | Maufer et al. | |
| 8,291,019 B1 | 10/2012 | Rochelle et al. | |
| 8,296,179 B1 | 10/2012 | Rennison | |
| 8,316,315 B2 | 11/2012 | Portnoy et al. | |
| 8,363,803 B2 * | 1/2013 | Gupta | 379/142.02 |
| 8,365,235 B2 * | 1/2013 | Hunt et al. | 725/88 |
| 8,392,409 B1 | 3/2013 | Kashyap et al. | |
| 8,392,836 B1 * | 3/2013 | Bau | G06Q 10/107 715/739 |
| 8,412,174 B2 * | 4/2013 | Khosravi | 455/418 |
| 8,423,545 B2 | 4/2013 | Cort et al. | |
| 8,433,762 B1 | 4/2013 | Wald et al. | |
| 8,443,441 B2 | 5/2013 | Stolfo et al. | |
| 8,447,789 B2 | 5/2013 | Geller | |
| 8,452,745 B2 | 5/2013 | Ramakrishna | |
| 8,463,872 B2 | 6/2013 | Pounds et al. | |
| 8,468,168 B2 | 6/2013 | Brezina et al. | |
| 8,495,045 B2 | 7/2013 | Wolf et al. | |
| 8,510,389 B1 | 8/2013 | Gurajada et al. | |
| 8,522,257 B2 | 8/2013 | Rupp et al. | |
| 8,549,412 B2 | 10/2013 | Brezina et al. | |
| 8,566,306 B2 | 10/2013 | Jones | |
| 8,600,343 B2 | 12/2013 | Brezina et al. | |
| 8,606,335 B2 * | 12/2013 | Ozaki | 455/569.2 |
| 8,620,935 B2 | 12/2013 | Rubin et al. | |
| 8,661,002 B2 | 2/2014 | Smith et al. | |
| 8,666,035 B2 | 3/2014 | Timmins et al. | |
| 8,694,633 B2 | 4/2014 | Mansfield et al. | |
| 8,745,060 B2 | 6/2014 | Brezina et al. | |
| 8,768,291 B2 | 7/2014 | Williams et al. | |
| 8,793,625 B2 | 7/2014 | Rhee et al. | |
| 8,818,995 B1 | 8/2014 | Guha | |
| 8,849,816 B2 | 9/2014 | Burba et al. | |
| 8,930,463 B2 | 1/2015 | Bonforte et al. | |
| 8,972,257 B2 | 3/2015 | Bonforte | |
| 8,984,074 B2 | 3/2015 | Monaco | |
| 8,990,323 B2 | 3/2015 | Hein et al. | |
| 9,009,065 B2 | 4/2015 | Reis et al. | |
| 9,020,938 B2 | 4/2015 | Cort et al. | |
| 9,058,366 B2 | 6/2015 | Brezina et al. | |
| 9,087,323 B2 | 7/2015 | Hein et al. | |
| 9,159,057 B2 | 10/2015 | Monaco | |

(56) References Cited

U.S. PATENT DOCUMENTS

| | | |
|---|---|---|
| 9,195,753 B1 | 11/2015 | King et al. |
| 9,195,969 B2 | 11/2015 | Bau et al. |
| 9,235,848 B1 | 1/2016 | Gourley et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 9,304,621 B1 | 4/2016 | Wakim et al. |
| 9,501,561 B2 | 11/2016 | Rubin et al. |
| 9,569,529 B2 | 2/2017 | Rubin et al. |
| 9,584,343 B2 | 2/2017 | Brezina et al. |
| 9,591,086 B2 | 3/2017 | Brezina et al. |
| 9,594,832 B2 | 3/2017 | Rubin et al. |
| 9,596,308 B2 | 3/2017 | Brezina et al. |
| 9,685,158 B2 | 6/2017 | Bonforte |
| 9,699,258 B2 | 7/2017 | Brezina et al. |
| 9,716,764 B2 | 7/2017 | Brezina et al. |
| 9,721,228 B2 | 8/2017 | Cort et al. |
| 9,747,583 B2 | 8/2017 | Monaco |
| 9,800,679 B2 | 10/2017 | Hein et al. |
| 9,819,765 B2 | 11/2017 | Thatcher et al. |
| 9,842,144 B2 | 12/2017 | Cort et al. |
| 9,842,145 B2 | 12/2017 | Cort et al. |
| 2001/0037407 A1 | 11/2001 | Dragulev et al. |
| 2001/0049628 A1 | 12/2001 | Icho |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1 | 6/2002 | Kremer et al. |
| 2002/0076004 A1 | 6/2002 | Brockenbrough et al. |
| 2002/0078090 A1* | 6/2002 | Hwang et al. ............ 707/513 |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0152216 A1 | 10/2002 | Bouthors |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1* | 2/2003 | Mansfield ................ 705/50 |
| 2003/0093483 A1 | 5/2003 | Allen et al. |
| 2003/0114956 A1 | 6/2003 | Cullen et al. |
| 2003/0120608 A1 | 6/2003 | Pereyra |
| 2003/0142125 A1 | 7/2003 | Salmimaa et al. |
| 2003/0167324 A1 | 9/2003 | Farnham et al. |
| 2003/0195937 A1 | 10/2003 | Kircher, Jr. et al. |
| 2003/0204439 A1 | 10/2003 | Cullen, III |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015547 A1 | 1/2004 | Griffin et al. |
| 2004/0015554 A1 | 1/2004 | Wilson |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0133561 A1 | 7/2004 | Burke |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0210827 A1* | 10/2004 | Burg ................. G06Q 10/10 715/205 |
| 2004/0215726 A1 | 10/2004 | Arning et al. |
| 2004/0260756 A1 | 12/2004 | Forstall et al. |
| 2004/0268229 A1 | 12/2004 | Paoli et al. |
| 2005/0015432 A1 | 1/2005 | Cohen |
| 2005/0027779 A1 | 2/2005 | Schinner |
| 2005/0038687 A1 | 2/2005 | Galdes |
| 2005/0044152 A1 | 2/2005 | Hardy et al. |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0080868 A1 | 4/2005 | Malik |
| 2005/0091272 A1 | 4/2005 | Smith et al. |
| 2005/0091314 A1 | 4/2005 | Blagsvedt et al. |
| 2005/0102257 A1 | 5/2005 | Onyon et al. |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0149620 A1 | 7/2005 | Kirkland et al. |
| 2005/0159970 A1* | 7/2005 | Buyukkokten et al. ......... 705/1 |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004713 A1 | 1/2006 | Korte et al. |
| 2006/0004892 A1 | 1/2006 | Lunt |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0083357 A1 | 4/2006 | Howell et al. |
| 2006/0083358 A1 | 4/2006 | Fong et al. |
| 2006/0085752 A1 | 4/2006 | Beadle et al. |
| 2006/0095331 A1* | 5/2006 | O'Malley ......... G06F 17/30902 705/22 |
| 2006/0095502 A1 | 5/2006 | Lewis et al. |
| 2006/0101285 A1 | 5/2006 | Chen et al. |
| 2006/0101350 A1 | 5/2006 | Scott |
| 2006/0123357 A1 | 6/2006 | Okamura |
| 2006/0136494 A1 | 6/2006 | Oh |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |

(56) References Cited

U.S. PATENT DOCUMENTS

| | | |
|---|---|---|
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050455 A1 | 3/2007 | Yach et al. |
| 2007/0060328 A1 | 3/2007 | Zrike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118533 A1 | 5/2007 | Ramer et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0198500 A1 | 8/2007 | Lucovsky et al. |
| 2007/0203991 A1 | 8/2007 | Fisher et al. |
| 2007/0208802 A1 | 9/2007 | Barman et al. |
| 2007/0214141 A1 | 9/2007 | Sittig |
| 2007/0218900 A1 | 9/2007 | Abhyanker |
| 2007/0244881 A1 | 10/2007 | Cha et al. |
| 2007/0250585 A1 | 10/2007 | Ly et al. |
| 2007/0255794 A1 | 11/2007 | Coutts |
| 2007/0271527 A1 | 11/2007 | Paas et al. |
| 2007/0273517 A1 | 11/2007 | Govind |
| 2007/0282956 A1 | 12/2007 | Staats |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth |
| 2008/0040435 A1 | 2/2008 | Buschi et al. |
| 2008/0040474 A1 | 2/2008 | Zuckerberg |
| 2008/0040475 A1 | 2/2008 | Bosworth |
| 2008/0055263 A1 | 3/2008 | Lemay et al. |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1* | 6/2008 | Jeon et al. ............. 715/788 |
| 2008/0147639 A1 | 6/2008 | Hartman et al. |
| 2008/0147810 A1 | 6/2008 | Kumar et al. |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0189122 A1* | 8/2008 | Coletrane ............ G06Q 10/107 705/319 |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0242277 A1 | 10/2008 | Chen et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0290987 A1 | 11/2008 | Li |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307066 A1 | 12/2008 | Amidon et al. |
| 2008/0319943 A1 | 12/2008 | Fischer |
| 2009/0005076 A1 | 1/2009 | Forstall et al. |
| 2009/0006366 A1 | 1/2009 | Johnson et al. |
| 2009/0010353 A1 | 1/2009 | She et al. |
| 2009/0029674 A1 | 1/2009 | Brezina et al. |
| 2009/0030773 A1 | 1/2009 | Kamhoot |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo |
| 2009/0077026 A1 | 3/2009 | Kazuhisa |
| 2009/0083278 A1 | 3/2009 | Zhao et al. |
| 2009/0100384 A1* | 4/2009 | Louch ........................ 715/863 |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0119678 A1 | 5/2009 | Shih et al. |
| 2009/0150251 A1 | 6/2009 | Zhitomirsky |
| 2009/0156170 A1 | 6/2009 | Rossano et al. |
| 2009/0157717 A1 | 6/2009 | Palahnuk et al. |
| 2009/0171930 A1 | 7/2009 | Vaughn et al. |
| 2009/0171979 A1 | 7/2009 | Lubarski et al. |
| 2009/0174680 A1 | 7/2009 | Anzures et al. |
| 2009/0177754 A1 | 7/2009 | Brezina et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0209286 A1 | 8/2009 | Bentley et al. |
| 2009/0213088 A1 | 8/2009 | Hardy et al. |
| 2009/0217178 A1* | 8/2009 | Niyogi ................ G06Q 10/00 715/753 |
| 2009/0228555 A1 | 9/2009 | Joviak et al. |
| 2009/0234815 A1 | 9/2009 | Boerries et al. |
| 2009/0234925 A1 | 9/2009 | Seippel, III et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0299824 A1* | 12/2009 | Barnes, Jr. .......... G06F 3/04847 705/7.39 |
| 2009/0300127 A1 | 12/2009 | Du |
| 2009/0300546 A1 | 12/2009 | Kwok et al. |
| 2009/0306981 A1 | 12/2009 | Cromack et al. |

(56) References Cited

U.S. PATENT DOCUMENTS

| | | |
|---|---|---|
| 2009/0313573 A1 | 12/2009 | Paek et al. |
| 2009/0319329 A1 | 12/2009 | Aggarwal et al. |
| 2009/0328161 A1 | 12/2009 | Puthenkulam et al. |
| 2010/0009332 A1 | 1/2010 | Yaskin et al. |
| 2010/0015954 A1* | 1/2010 | Yang ............... H04L 51/28 455/412.1 |
| 2010/0030715 A1 | 2/2010 | Eustice et al. |
| 2010/0036833 A1 | 2/2010 | Yeung et al. |
| 2010/0049534 A1 | 2/2010 | Whitnah |
| 2010/0057858 A1 | 3/2010 | Shen et al. |
| 2010/0057859 A1 | 3/2010 | Shen et al. |
| 2010/0062753 A1* | 3/2010 | Wen et al. ............. 455/418 |
| 2010/0070875 A1* | 3/2010 | Turski ............ G06Q 10/107 715/748 |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0100899 A1* | 4/2010 | Bradbury ........ H04N 7/17318 725/29 |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1* | 6/2010 | Felt et al. ............. 715/835 |
| 2010/0164957 A1 | 7/2010 | Lindsay |
| 2010/0167700 A1 | 7/2010 | Brock et al. |
| 2010/0169327 A1 | 7/2010 | Lindsay |
| 2010/0174784 A1 | 7/2010 | Levey et al. |
| 2010/0185610 A1 | 7/2010 | Lunt |
| 2010/0191844 A1* | 7/2010 | He et al. ............. 709/224 |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229223 A1 | 9/2010 | Shepard |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0281535 A1 | 11/2010 | Perry, Jr. et al. |
| 2010/0306185 A1* | 12/2010 | Smith ............. G06Q 10/107 707/709 |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1* | 3/2011 | Rashad ............ G06Q 10/107 709/206 |
| 2011/0086627 A1* | 4/2011 | Khosravi ............. 455/418 |
| 2011/0087969 A1 | 4/2011 | Hein et al. |
| 2011/0145192 A1 | 6/2011 | Quintela et al. |
| 2011/0145219 A1 | 6/2011 | Cierniak et al. |
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort |
| 2011/0196802 A1 | 8/2011 | Ellis et al. |
| 2011/0201275 A1 | 8/2011 | Jabara et al. |
| 2011/0219317 A1 | 9/2011 | Thatcher |
| 2011/0225293 A1 | 9/2011 | Rathod |
| 2011/0231407 A1 | 9/2011 | Gupta et al. |
| 2011/0235790 A1 | 9/2011 | Strope et al. |
| 2011/0252383 A1* | 10/2011 | Miyashita ............. 715/863 |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer et al. |
| 2011/0298701 A1 | 12/2011 | Holzer et al. |
| 2012/0011204 A1 | 1/2012 | Morin et al. |
| 2012/0017158 A1 | 1/2012 | Maguire et al. |
| 2012/0036254 A1 | 2/2012 | Onuma |
| 2012/0041907 A1 | 2/2012 | Wang et al. |
| 2012/0054681 A1 | 3/2012 | Cort et al. |
| 2012/0079023 A1 | 3/2012 | Tejada-Gamero et al. |
| 2012/0084461 A1* | 4/2012 | Athias et al. ............. 709/245 |
| 2012/0089678 A1 | 4/2012 | Cort |
| 2012/0089690 A1 | 4/2012 | Hein et al. |
| 2012/0110080 A1 | 5/2012 | Panyam et al. |
| 2012/0110096 A1 | 5/2012 | Smarr et al. |
| 2012/0150970 A1* | 6/2012 | Peterson et al. ............. 709/206 |
| 2012/0150978 A1 | 6/2012 | Monaco et al. |
| 2012/0150979 A1 | 6/2012 | Monaco |
| 2012/0166999 A1 | 6/2012 | Thatcher |
| 2012/0197871 A1* | 8/2012 | Mandel ............ G06F 17/30994 707/722 |
| 2012/0198348 A1 | 8/2012 | Park |
| 2012/0246065 A1 | 9/2012 | Yarvis et al. |
| 2012/0259834 A1 | 10/2012 | Broder et al. |
| 2012/0271822 A1* | 10/2012 | Schwendimann et al. ... 707/736 |
| 2012/0278428 A1 | 11/2012 | Harrison et al. |
| 2012/0330658 A1 | 12/2012 | Bonforte |
| 2012/0330980 A1 | 12/2012 | Rubin et al. |
| 2013/0007627 A1 | 1/2013 | Monaco |
| 2013/0014021 A1* | 1/2013 | Bau et al. ............. 715/739 |
| 2013/0080915 A1 | 3/2013 | Lewis et al. |
| 2013/0091288 A1 | 4/2013 | Shalunov et al. |
| 2013/0120444 A1 | 5/2013 | Allyn et al. |
| 2013/0173712 A1 | 7/2013 | Monjas Llorente et al. |
| 2013/0246931 A1 | 9/2013 | Harris et al. |
| 2013/0260795 A1 | 10/2013 | Papakipos et al. |
| 2014/0011481 A1 | 1/2014 | Kho |
| 2014/0081914 A1 | 3/2014 | Smith et al. |
| 2014/0081964 A1 | 3/2014 | Rubin et al. |
| 2014/0087687 A1 | 3/2014 | Brezina et al. |
| 2014/0089304 A1 | 3/2014 | Rubin et al. |
| 2014/0089411 A1 | 3/2014 | Rubin et al. |
| 2014/0095433 A1 | 4/2014 | Cort et al. |
| 2014/0100861 A1 | 4/2014 | Ledet |
| 2014/0115086 A1 | 4/2014 | Chebiyyam |
| 2014/0156650 A1 | 6/2014 | Jacobson |
| 2014/0207761 A1 | 7/2014 | Brezina et al. |
| 2014/0214981 A1 | 7/2014 | Mallet et al. |
| 2014/0280097 A1 | 9/2014 | Lee et al. |
| 2014/0287786 A1 | 9/2014 | Bayraktar et al. |
| 2015/0074213 A1 | 3/2015 | Monaco |
| 2015/0170650 A1 | 6/2015 | Bonforte |
| 2015/0222719 A1 | 8/2015 | Hein et al. |
| 2016/0070787 A1 | 3/2016 | Brezina et al. |
| 2016/0182661 A1 | 6/2016 | Brezina et al. |
| 2017/0147699 A1 | 5/2017 | Rubin et al. |
| 2017/0171124 A1 | 6/2017 | Brezina et al. |
| 2017/0187663 A1 | 6/2017 | Brezina et al. |
| 2017/0287483 A1 | 10/2017 | Bonforte |
| 2017/0302749 A1 | 10/2017 | Brezina et al. |
| 2017/0324821 A1 | 11/2017 | Brezina et al. |
| 2017/0337514 A1 | 11/2017 | Cort et al. |
| 2018/0046985 A1 | 2/2018 | Monaco |

FOREIGN PATENT DOCUMENTS

| | | |
|---|---|---|
| JP | 2007249307 | 9/2007 |
| KR | 20060056015 | 5/2006 |
| KR | 1020090068819 | 6/2009 |
| KR | 1020090112257 | 10/2009 |
| KR | 1020020060386 | 8/2012 |
| KR | 1020090115239 | 8/2012 |
| WO | 2003098515 | 11/2003 |
| WO | 2007037875 | 4/2007 |
| WO | 2007143232 | 12/2007 |
| WO | 2012082929 | 6/2012 |

OTHER PUBLICATIONS

Bernstein, Michael S. et al., "Enhancing Directed Content Sharing on the Web," Proceedings of the 28th International Conference on

(56) References Cited

OTHER PUBLICATIONS

Human Factors in Computing Systems, Atlanta, GA, Apr. 10-15, 2010, pp. 971-980.
Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.
Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).
Elsayed, Tamer et al., "Personal Name Resolution in Email: A Heuristic Approach," University of Maryland Technical Report No. TR-LAMP-150, Mar. 17, 2008.
Fitzpatrick, Brad, "AddressBooker," Github Social Coding, located at http://addressbooker.appspot.com/, Nov. 28, 2008 (document provided includes third-party comments submitted under the USPTO PeerToPatent program).
Google Inc. "OpenSocial Tutorial," located at http://code.google.com/apis/opensocial/articles/tutorial/tutorial-0.8.html, Aug. 2008.
Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).
Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).
International Patent Application PCT/US10/34782, International Search Report, dated Dec. 22, 2010.
International Patent Application PCT/US10/34782, Written Opinion, dated Dec. 22, 2010.
International Patent Application PCT/US10/35405, International Search Report and Written Opinion, dated Jan. 3, 2011.
International Patent Application PCT/US12/043523, International Search Report and Written Opinion, dated Nov. 28, 2012.
Microsoft Corporation, "About AutoComplete Name Suggesting," Microsoft Outlook 2003 help forum, located at http://office.microsoft.com/en-us/outlook/HP063766471033.aspx, 2003.
OpenSocial Foundation, "Social Application Tutorial (v0.9)," located at http://wiki.opensocial.org/index.php?title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
International Patent Application PCT/US2011/064892, International Search Report and Written Opinion, dated Aug. 22, 2012.
European Patent Application No. 11849271.9, Extended Search Report, dated Apr. 3, 2014.
Extended European Search Report, EP 10 78 3783, dated Mar. 24, 2014.
International Patent Application PCT/US10/52081, International Search Report and Written Opinion, dated May 20, 2011.
International Patent Application PCT/US11/64958, International Search Report and Written Opinion, dated Jul. 31, 2012.
International Patent Application PCT/US2012/043507, International Search Report and Written Opinion, dated Jan. 3, 2013.
U.S. Appl. No. 61/407,018, filed Oct. 27, 2010.
European Patent Application No. 12801970.0, Extended Search Report, dated Oct. 23, 2014.
European Patent Application 12801998.1, Extended Search Report, dated Feb. 10, 2015.
Epstein, "Harnessing User Data to Improve Facebook Features", Doctoral dissertation, Boston College, May 12, 2010.
Hannon et al., "Recommending Twitter Users to Follow Using Content and Collaborative Filtering Approaches", RecSys2010, Sep. 26-30, 2010, Barcelona, Spain.
International Patent Application PCT/US10/56560, International Search Report and Written Opinion, dated Jun. 21, 2011.
Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.
W3i, LLC, "Advertiser Feedback System (AFS)," company product description. Sep. 22, 2009.
Wikimedia Foundation, Inc., "Machine Learning," Wikipedia encyclopedia entry located at http://en.wikipedia.org/wiki/Machine_learning, Jan. 30, 2011.
"OpenSocial Specification v0.9", OpenSocial and Gadgets Specification Group, Apr. 2009.
"The Ultimate Guide for Everything Twitter", Webdesigner Depot, archive.org webpage https://web.archive.org/web/20090325042115/http://www.webdesignerdepot.com/2009/03/the-ultimate-guide-for-everything- twitter/ from Mar. 25, 2009.
European Patent Application No. 10797483.4, extended European Search Report, dated Dec. 20, 2016.

* cited by examiner

PRESENTING FAVORITE CONTACTS INFORMATION TO A USER OF A COMPUTING DEVICE

CROSS-REFERENCE TO RELATED APPLICATIONS

The present application claims priority to U.S. Provisional Application Ser. No. 61/499,652, filed Jun. 21, 2011, entitled "Presenting Favorite Contacts Information to a User of a Computing Device," by J. Bonforte, the entire contents of which application is incorporated by reference as if fully set forth herein.

The present application is related to U.S. patent application Ser. No. 12/792,698, filed Jun. 2, 2010, entitled "SELF POPULATING ADDRESS BOOK," by Smith et al., which was also published as U.S. Patent Publication No. 2010/0306185 on Dec. 2, 2010, the entire contents of which applications are incorporated by reference as if fully set forth herein.

The present application is also related to U.S. Patent Application Ser. No. 61/423,052, filed Dec. 14, 2010, entitled "SENDER-BASED RANKING OF PERSON PROFILES AND MULTI-PERSON AUTOMATIC SUGGESTIONS," by P. Monaco, and also to U.S. Patent Publication No. 2012/0150979 published on Jun. 14, 2012, and having the same title and inventor as the foregoing provisional application, the entire contents of which applications are incorporated by reference as if fully set forth herein.

FIELD OF THE TECHNOLOGY

At least some embodiments disclosed herein relate to information processing systems in general, and more particularly, but not limited to, presenting information to a user regarding favorite contacts of the user.

BACKGROUND

Users of mobile devices such as Android and Apple iPhone devices typically send and receive email, voice and other messages to and from numerous other persons (e.g., friends or business associates). When the user of the mobile device desires to initiate a communication with one of these persons, the user in some cases may look at a list of favorites previously selected or created by the user (by manual selection) in order to choose a person for a new communication initiated from the mobile device.

SUMMARY OF THE DESCRIPTION

Systems and methods for presenting information to a user regarding favorite contacts of the user (e.g., a list of favorite contacts, as determined based on a relevancy ranking or some other correlation or association relative to the user) are described herein. Some embodiments are summarized in this section.

In one embodiment, a method includes storing a plurality of person profiles for persons referenced in communications received by a user of a computing device (e.g., a mobile device); selecting, using at least one processor (e.g., of a server or of a mobile device), a set of contacts (e.g., stored in a database on the server and/or the mobile device) from the plurality of person profiles based on a relevancy ranking, wherein the set of contacts is selected for display to the user on the computing device (e.g., a mobile device or a user terminal); and organizing, using the at least one processor, the set of contacts into at least two time groups, each time group associated with a different time period, wherein contacts will be displayed to the user within each time group based on a relevancy ranking for each contact within the time group.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
FIG. 1 shows an example of a display screen provided to a user of a mobile device for navigating and selecting from favorite contacts according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a computing device (e.g., a mobile device) owned by a user stores data (e.g., in a database in the form of person profiles) associated with prior communications and/or other activity of the user on the mobile device (e.g., data extracted from prior emails received by the user). Alternatively, the data may be stored on a server associated with the mobile device. A display of favorite contacts is presented to the user. The display organizes the contacts based on relevancy for two or more different time periods (i.e., a corresponding time period over which prior data in the database is analyzed for determining and ranking the favorite contacts).

One time period may be for "All Time" (i.e., the entire history of all communications by the user with others). The other time period may be a predefined time period such as "Last 10 Days" or "Today". The favorite contacts are presented in a ranked order within each time period grouping based on a relevancy ranking for each contact (i.e., one person may be ranked highest in the "Today" grouping, but ranked lower in the "All Time" grouping). Also, the relevancy ranking criteria may be selected to be different for each grouping. The relevancy ranking may be based, for example, on a relevancy system as described in U.S. patent application Ser. No. 12/792,698, incorporated by reference above.

In one embodiment of the '698 Application incorporated above, a method includes: gathering first information from received communications and second information from outside sources, the second information comprising information gathered from a plurality of websites including a social network website, wherein the first information includes one or more keywords contained in the communications, and wherein at least a portion of the first information is used to perform a search to gather the second information; adding the first information and the second information to a first contact profile of a plurality of contact profiles in an address book of a user, wherein each contact profile has an associated contact, and the first contact profile is associated with a first contact; analyzing each contact profile including identifying one or more entries in each contact profile, each entry containing information related to the respective associated contact, and at least one of the entries including information gathered from the social network website; assigning one or more weights to the one or more entries based on one or more criteria, wherein the one or more criteria include whether the one or more keywords are contained in one or more communications with the respective associated contact from the received communications and a number of times the one or more keywords occur in the one or more communications with the respective associated contact; and ranking the plurality of contact profiles based on the one or more assigned weights.

In another embodiment of the '698 Application incorporated above, a method includes: forming a first address book of a user, the first address book comprising first person profiles including a profile of a first sender; updating, by a computing device, the first person profiles using information extracted from communications received by the user from senders including the first sender, the information extracted from bodies of the communications, and information extracted from at least one online social network; receiving a selection by the user of a subset of the first person profiles to be shared, the selection based on a search of the information extracted from the social network and the information extracted from the communications received by the user in the first person profiles to identify profiles that satisfy a keyword search criterion, the identified profiles including the profile of the first sender, and satisfaction of the keyword search criterion comprising a match to the information extracted from the social network; sharing the subset with the first sender; receiving a portion of a second address book from the first sender, the portion including second person profiles; and adding, by the computing device, the second person profiles to the first address book.

The user may scroll through a list of contacts for each grouping by moving a finger left to right or by using another predefined user action. This list may be greater in number than that number that is initially displayed on a single screen (e.g., the list may be 30 contacts or some other predefined number of contacts).

In another embodiment, the user may be further presented with an ability to navigate favorite contacts in an hierarchical manner using the favorite contacts that are initially displayed (i.e., displayed on the first or top screen). More specifically, the user may tap and hold (or use some other predefined user interface action) to cause the presentation of an additional subset of information for a given favorite contact. This subset of information includes a list of contacts most closely-associated with the selected favorite contact (e.g., as determined by the user's prior communications in the database). The closeness of association may be determined by relevancy as described herein and/or by other correlation or association approaches.

The user may tap on any of the persons listed to initiate a communication or get other information about that person (e.g., a person profile). This other information may itself include yet another list of contacts most closely associated with that person. Thus, a hierarchy of favorite contacts may be navigated by the user by tapping and holding (or otherwise selecting) on each of a series of contacts. This provides a convenient way to locate contact information for a person based on prior relationship data (e.g., as built up from prior communications, social network graphs or data, or other activity of the user).

After tapping and holding, other information that may be presented for any selected contact includes various ways of contacting that person (e.g., email, phone, or text message), which may be ranked in order of greatest frequency of use between the user and contact as determined from historical data (over all time or over another time period).

Numerous examples of various types of data (e.g., person profiles for callers associated with the user) that may be collected in a database as mentioned above for the user are described in U.S. patent application Ser. No. 12/792,698, incorporated by reference above. This data may be stored on the mobile device and/or on a server associated with or otherwise communicating with the mobile device.

In one embodiment, a mobile device of a user stores data (e.g., in a database in the form of person profiles) associated with prior communications and/or other activity of the user on the mobile device (e.g., data extracted from one of more of the following: prior communications such as email or text messages, voice messages, or other documents or information received by the user from the user's friends or other persons such as work associates). The other activity may include the manner or ways in which the user operates the mobile device (e.g., what buttons or functions or activated when the user has previously interacted with the caller, what online service is used by the user when previously interacting with the caller, etc.). This stored data will be used for determining relevancy of the favorite contacts to present to the user and/or of the types of communication options to present (e.g., voice versus text message).

FIG. 1 shows an example of a display screen provided to a user of a mobile device for navigating and selecting from favorite contacts (e.g., Jeff Bonforte, Angel Steger, and Josh Jacobson) according to one embodiment. As discussed above, favorite contacts are presented in three groups (All Time, Last 10 Days, and Today). This display screen is presented as a single screen on a smart phone or other mobile device (or even other computing device such as tablet or desktop), which may include a touch screen interface. Additional contacts may be scrolled onto the screen by a finger motion on a touch screen, such as discussed above.

As an example, the user may tap and hold (using a touch screen interface) on the image of Jeff Bonforte to see additional information (not shown) about Jeff Bonforte, including a list of related contacts (e.g., his brothers and sisters). A contact for a brother may then be tapped and held to present yet another list of related contacts (e.g., the children and wife of this brother) (not shown). This may continue for many levels (not shown), to the extent of data available for presenting information to the user (e.g., to the extent of the user database of stored history data or other contact data). At any point in the hierarchy, a quick tap (or other defined action) may be used to initiate a communication with the selected contact (e.g., a phone call).

In an even more specific, non-limiting example, the top line in FIG. 1 is a list of all the people the user knows ranked in order of relevancy over all time (i.e., the most important people based on prior communications over a long period of time).

The next list of contacts below that is based on the last 10 days. This list is de-duped (i.e., no duplicates are presented again) against the user's All Time list, and shows people that are most relevant to the user over the last 10 days (the relevancy for people in this list may be different than the relevancy determined for people in the All Time list).

The bottom list is for today's activity (e.g., phone behavior associated within a very short time period of the last 24 hours). Email activity or calendar information combined with email activity may be used as some of the criteria in selecting the persons in this list (relevancy also may be used).

In FIG. 1, the user can scroll each individual group (e.g., left or right) to list out or access a larger number of people. This is also a smart favorites list. In other words, if the user touches quickly on any one person, the mobile device proceeds to automatically call that person and does so using the most relevant or frequently used phone number or other way to contact that person based on the previous history of communications of the user with that person.

If the user taps and holds on the person, the mobile device presents the many ways that the user can reach that person, and also lists a predefined number of people that the user and the person have in common (not shown). This is a convenient and faster way to get in touch with someone as compared to prior approaches—the list of people is ranked in order by relevancy and the user can go down multiple levels.

The prior user history is examined to determine the most common form of communication (e.g., email, text message, or voice) of the user. This may be done for a predetermined time period, such as a set number of hours, days, or weeks. Then, that most common form is used for the immediate tap calling, or is presented in order as the number one choice when options are presented to the user.

The above approach may be extended to companies or other organizations, and even to particular topics (e.g., the user may tap and hold on a company icon, and people relevant to the company are listed in ranked order of relevance to the user).

Figure 2:
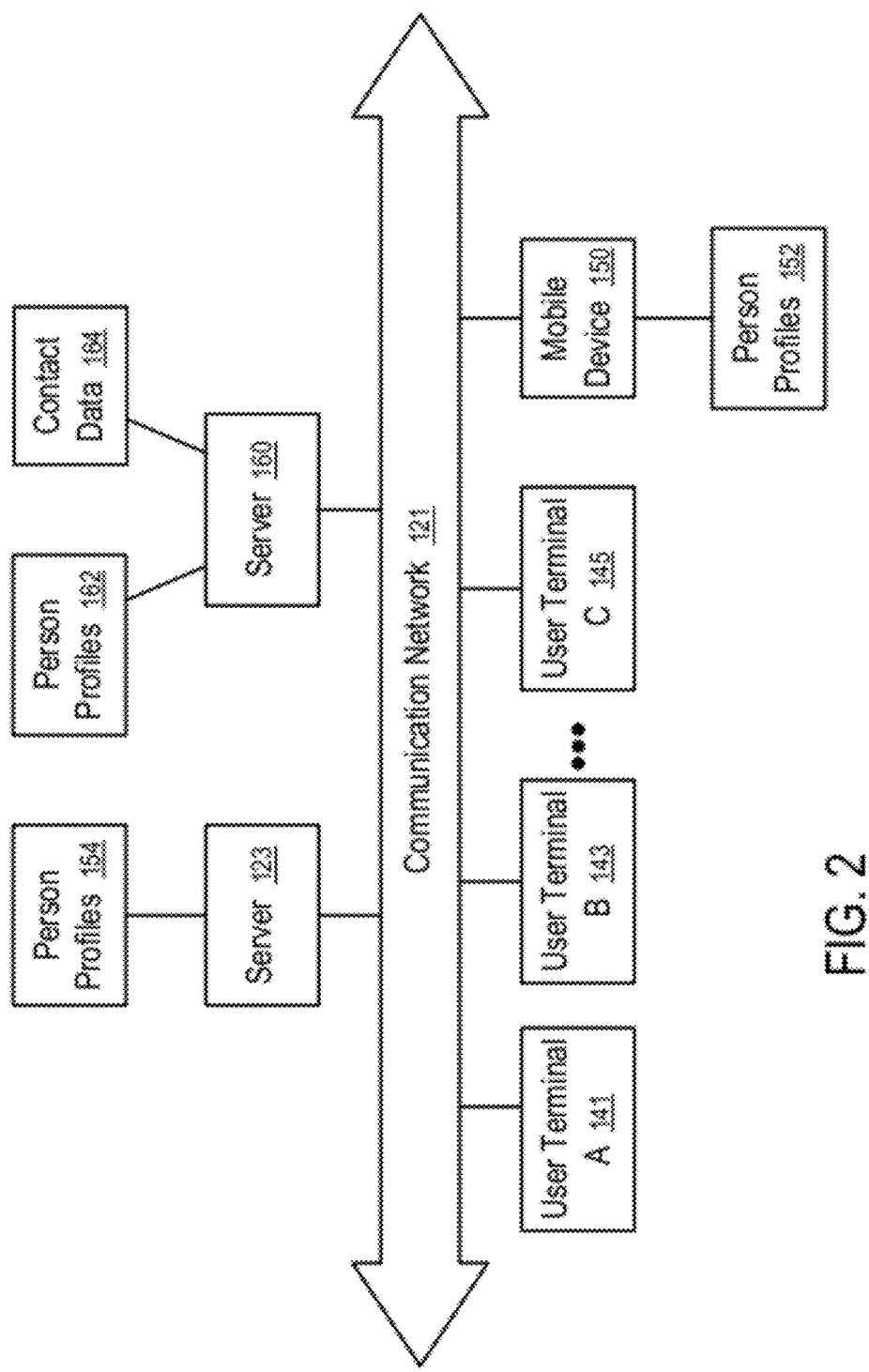
FIG. 2 shows a system to present information to a user regarding favorite or most closely-associated contacts of the user according to one embodiment.

FIG. 2 shows a system to present information to a user regarding favorite or most closely-associated contacts of the user, such as by display on a computing device of the user (e.g., a mobile device 150 such as an iPhone device), according to one embodiment. In FIG. 2, the user terminals (e.g., 141, 143, ..., 145) and/or mobile devices including mobile device 150 are used to access a server 123 over a communication network 121.

The server 123 may include one or more web servers (or other types of data communication servers) to communicate with the user terminals (e.g., 141, 143, ..., 145) and/or mobile devices.

The server 123 may be connected to a data storage facility to store user provided content, such as multimedia content, navigation data, preference data, etc. The server 123 may also store or have access to stored person profiles 154.

Person profiles 154 (and/or person profiles 162 and person profiles 152) may be created and updated based on email or other communications to and from mobile device 150 and other mobile devices of various users. In an alternative embodiment, person profiles 152 may be stored in a memory of mobile device 150. During operation, mobile device 150 may access and use person profiles obtained locally from mobile device 150 or obtained over communication network 121 from server 123 (and/or server 160).

Server 160 may store person profiles 162, which in some embodiments may include profiles received from mobile device 150 and/or server 123. Some or all of person profiles 162 may also be received from other computing devices not illustrated in FIG. 2. Person profiles 162 and/or contact data 164 (stored at server 160) may be accessed and used (e.g., by mobile device 150) for relevancy rankings and/or presentation of contacts as described herein.

Although FIG. 2 illustrates an example system implemented in client server architecture, embodiments of the disclosure can be implemented in various alternative architectures. For example, the system can be implemented via a peer to peer network of user terminals, where content and data are shared via peer to peer communication connections.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 3:
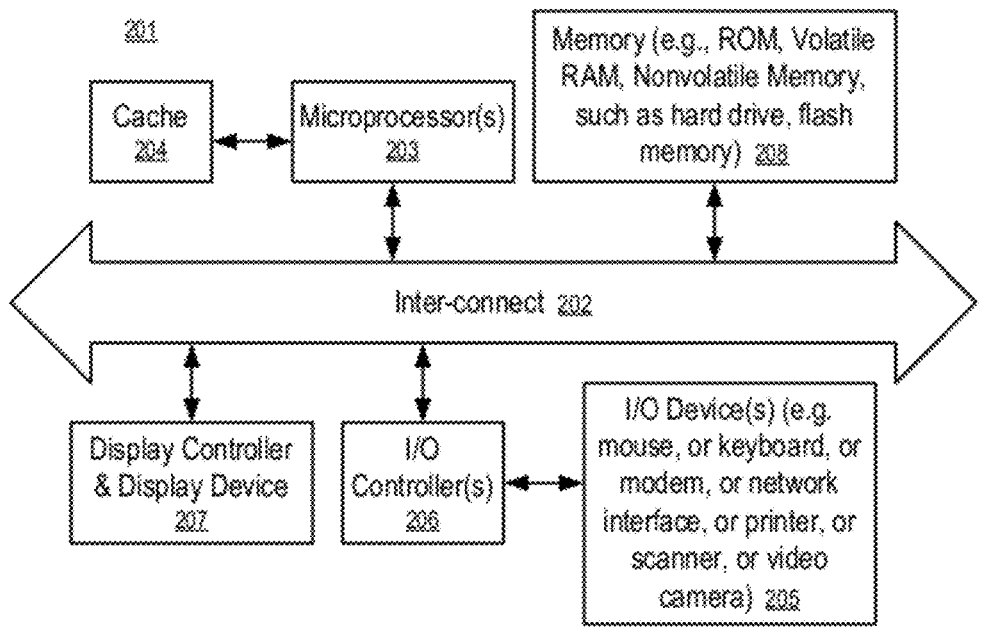
FIG. 3 shows a block diagram of a data processing system which can be used in various embodiments.

FIG. 3 shows a block diagram of a data processing system which can be used in various embodiments (e.g., to implement server 123 or server 160). While FIG. 3 illustrates various components of a computer system, it is not intended to represent any particular architecture or manner of interconnecting the components. Other systems that have fewer or more components may also be used.

In FIG. 3, the system 201 includes an inter-connect 202 (e.g., bus and system core logic), which interconnects a microprocessor(s) 203 and memory 208. The microprocessor 203 is coupled to cache memory 204 in the example of FIG. 3.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used. In one embodiment, a data processing system as illustrated in FIG. 3 is used to implement a server.

In one embodiment, a data processing system as illustrated in FIG. 3 is used to implement a user terminal. A user terminal may be in the form of a personal digital assistant (PDA), a cellular phone or other mobile device, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 4:
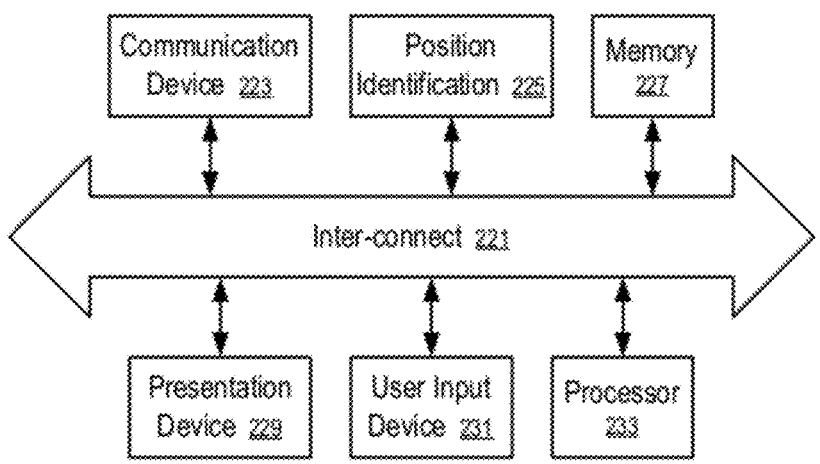
FIG. 4 shows a block diagram of a user device according to one embodiment.

FIG. 4 shows a block diagram of a user device (e.g., mobile device 150) according to one embodiment. In FIG. 4, the user device includes an inter-connect 221 connecting the presentation device 229, user input device 231, a processor 233, a memory 227, a position identification unit 225 and a communication device 223.

In FIG. 4, the position identification unit 225 is used to identify a geographic location for user content created for sharing. The position identification unit 225 may include a satellite positioning system receiver, such as a Global Positioning System (GPS) receiver, to automatically identify the current position of the user device.

In FIG. 4, the communication device 223 is configured to communicate with a server. In one embodiment, the user input device 231 is configured to generate user data content. The user input device 231 may include a text input device, a still image camera, a video camera, and/or a sound recorder, etc.

Various further embodiments are now here described. In one embodiment, a method, comprises: storing a plurality of person profiles for persons referenced in communications received by a user of a mobile device; selecting, using at least one processor, a set of contacts from the plurality of person profiles based on a relevancy ranking, wherein the set of contacts is selected for display to the user on the mobile device; and organizing, using the at least one processor, the set of contacts into at least two time groups, each time group associated with a different time period (e.g., today, the last ten days, or all time prior to the present moment), wherein contacts will be displayed to the user within each time group based on a relevancy ranking for each contact within the time group.

In one embodiment, a server includes the at least one processor, and the method further comprises sending the set of contacts to the mobile device for display. In one embodiment, the method further comprises storing data associated with prior activities of the user on the mobile device, and the selecting the set of contacts is further based on the stored data.

In one embodiment, the mobile device includes the at least one processor, and the method further comprises presenting, using a display of the mobile device, the set of contacts to the user. The presenting may comprise displaying the contacts for each time group in a respective horizontal row for viewing by the user. The at least one processor may be configured to permit the user to scroll the contacts in the respective horizontal row for each time group in a left or right direction using a touch screen interface of the mobile device.

In one embodiment, the method further comprises receiving a predefined user interface action from the user to select a contact from the set of contacts, and in response to the action, presenting to the user on the display a list of contacts most closely-associated with the selected contact. The list of contacts may be selected from the plurality of person profiles. The most closely-associated contacts may be determined using relevancy rankings of the plurality of person profiles.

In one embodiment, a non-transitory computer-readable storage medium stores computer-readable instructions, which when executed, cause a computing apparatus to: store a plurality of person profiles for persons referenced in communications received by a user of a mobile device; select, using at least one processor, a set of contacts from the plurality of person profiles based on a relevancy ranking, wherein the set of contacts is selected for display to the user on the mobile device; and organize, using the at least one processor, the set of contacts into at least two time groups, each time group associated with a different time period, wherein contacts will be displayed to the user within each time group based on a relevancy ranking for each contact within the time group.

In one embodiment, a server includes the at least one processor, and the instructions further cause the computing apparatus to send the set of contacts to the mobile device for display. In one embodiment, the instructions further cause the computing apparatus to store data associated with prior activities of the user on the mobile device, and the selecting the set of contacts is further based on the stored data.

In one embodiment, a system comprises: at least one processor; and memory storing instructions configured to instruct the at least one processor to: store a plurality of person profiles for persons referenced in communications received by a user of a mobile device; select a set of contacts from the plurality of person profiles based on a relevancy ranking, wherein the set of contacts is selected for display to the user on the mobile device; and organize the set of contacts into at least two time groups, each time group associated with a different time period, wherein contacts will be displayed to the user within each time group based on a relevancy ranking for each contact within the time group.

In one embodiment, the system further comprises a display, and the instructions are further configured to instruct the at least one processor to present, using the display, the set of contacts to the user. In one embodiment, the presenting comprises displaying the contacts for each time group in a respective horizontal row for viewing by the user.

In one embodiment, the instructions are further configured to instruct the at least one processor to permit the user to scroll the contacts in the respective horizontal row for each time group in a left or right direction using a touch screen interface. In one embodiment, the instructions are further configured to instruct the at least one processor to receive a predefined user interface action from the user to select a contact from the set of contacts, and in response to the action, present to the user on the display a list of contacts most closely-associated with the selected contact.

The list of contacts may be selected from the plurality of person profiles. The most closely-associated contacts may be determined using relevancy rankings of the plurality of person profiles. The system may further comprise a database storing the plurality of person profiles.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   in response to receiving first communications from persons other than a user of a mobile device, extracting information from each communication of the first communications, wherein each of the first communications is addressed to the user;
   storing a plurality of person profiles for the persons, wherein each profile of the person profiles includes information extracted from at least one of the first communications, and further includes data associated with prior activities of the user on the mobile device when interacting with a person corresponding to the profile;

searching, for each person profile, using the respective information extracted from the first communications as search criteria to provide a respective search result;

extracting, for each person profile, respective social information from at least one social network;

adding the respective search result and respective social information to each person profile;

determining a relevancy ranking for each of the persons using the plurality of person profiles, the relevancy ranking determined based on the extracted information and the data associated with the prior activities of the user;

selecting, using at least one processor, a first set of contacts from the plurality of person profiles for a first time group and a second set of contacts for a second time group, wherein the first time group is for a different time period than the second time group, each contact of the first set of contacts corresponds to a different one of the persons, and each contact of the second set of contacts corresponds to a different one of the persons;

organizing, using the at least one processor, each of the first and second sets of contacts in a respective ranked order for display to the user based on the relevancy ranking, the first and second sets simultaneously displayed on a same screen of a user interface, wherein a first ranked order of the first set of contacts as displayed to the user is different than a second ranked order of the second set of contacts as displayed to the user, wherein the first set of contacts is ranked based on first criteria comprising the respective social information for each person profile, wherein the second set of contacts is ranked based on second criteria comprising the respective search result for each person profile, and wherein the first criteria and second criteria are different; and in response to a selection of a first contact from the first set of contacts, the selection made by the user in the same screen of the user interface, causing display of a list of persons that the user and the first contact have in common, wherein the list of persons is ranked in an order based on the relevancy ranking, and further causing display of multiple options for communicating with the first contact, each of the options ranked in order based on frequency of use in prior communications between the user and the first contact.

2. The method of claim 1, further comprising sending the first and second sets of contacts to the mobile device for display.

3. The method of claim 1, further comprising presenting, on the same screen using a display of the mobile device, the first and second sets of contacts to the user.

4. The method of claim 3, wherein the presenting comprises displaying each of the first and second sets of contacts in a respective horizontal row for viewing on the same screen by the user.

5. The method of claim 4, wherein a touch screen interface displays the same screen, the method further comprising enabling the user to scroll contacts in the respective horizontal row in a left or right direction using the touch screen interface.

6. The method of claim 1, further comprising de-duping the first and second sets of contacts prior to the display to the user.

7. The method of claim 1, wherein at least one of the first communications is a text message.

8. The method of claim 1, wherein information extracted from the first communications comprises information extracted from a document received from a person other than the user.

9. The method of claim 1, further comprising storing an additional plurality of person profiles, the additional plurality associated with an additional user, wherein each profile of the additional plurality of person profiles includes information extracted from at least one of second communications addressed to the additional user, and further includes data associated with prior activities of the additional user on a different mobile device when interacting with a person corresponding to the profile.

10. A non-transitory computer-readable storage medium storing computer-readable instructions, which when executed, cause a computing apparatus to:

in response to receiving communications from persons other than a user of a mobile device, extract information from each communication of the communications, wherein each of the communications is addressed to the user;

store a plurality of person profiles, wherein each profile of the person profiles includes information extracted from at least one of the communications, and further includes data associated with prior activities of the user on the mobile device;

search, for each person profile, using the respective information extracted from the communications as search criteria to provide a respective search result;

extract, for each person profile, respective social information from at least one social network;

add the respective search result and respective social information to each person profile;

determine a relevancy ranking for each of the persons using the plurality of person profiles;

select, using at least one processor, a first set of contacts from the plurality of person profiles for a first time group and a second set of contacts for a second time group, wherein the first time group is for a different time period than the second time group, each contact of the first set of contacts corresponds to a different one of the persons, and each contact of the second set of contacts corresponds to a different one of the persons;

organize, using the at least one processor, the first and second sets of contacts in a respective ranked order for display to the user based on the relevancy ranking, the first and second sets simultaneously displayed on a same screen of a user interface, wherein a first ranked order of the first set of contacts as displayed to the user is different than a second ranked order of the second set of contacts as displayed to the user, wherein the first set of contacts is ranked based on first criteria comprising the respective social information for each person profile, wherein the second set of contacts is ranked based on second criteria comprising the respective search result for each person profile, and wherein the first criteria and second criteria are different; and in response to a selection of a first contact from the first set of contacts, the selection made by the user in the same screen of the user interface, cause display of a list of persons that the user and the first contact have in common, wherein the list of persons is ranked in an order based on the relevancy ranking, and further cause display of multiple options for communicating with the first contact, each of the options ranked in order based on frequency of use in prior communications between the user and the first contact.

11. The storage medium of claim 10, wherein the instructions further cause the computing apparatus to send the first and second sets of contacts to the mobile device for display on the same screen.

12. A system, comprising:
   a display;
   at least one processor; and
   memory storing instructions configured to instruct the at least one processor to:
      in response to receiving communications from persons other than a user, extract information from each communication of the communications, wherein each of the communications is addressed to the user;
      store a plurality of person profiles for the persons, wherein each profile of the person profiles includes information extracted from at least one of the communications, and further includes data associated with prior activities of the user when interacting with a person corresponding to the profile;
      search, for each person profile, using the respective information extracted from the communications as search criteria to provide a respective search result;
      extract, for each person profile, respective social information from at least one social network;
      add the respective search result and respective social information to each person profile;
      determine a relevancy ranking for each of the persons using the plurality of person profiles, the relevancy ranking determined based on the extracted information and the data associated with the prior activities of the user;
      select a first set of contacts from the plurality of person profiles for a first time group and a second set of contacts for a second time group, wherein the first time group is for a different time period than the second time group, each contact of the first set of contacts corresponds to a different one of the persons;
      organize each of the first and second sets of contacts in a respective ranked order for display to the user based on the relevancy ranking, the first and second sets simultaneously displayed on a same screen, wherein a first ranked order of the first set of contacts as displayed to the user is different than a second ranked order of the second set of contacts as displayed to the user, wherein the first set of contacts is ranked based on first criteria comprising the respective social information for each person profile, wherein the second set of contacts is ranked based on second criteria comprising the respective search result for each person profile, and wherein the first criteria and second criteria are different;
      present, using the display, the first and second sets of contacts to the user; and
      in response to receiving a predefined user interface action from the user to select a contact from the first set of contacts, the user interface action made in the same screen, present to the user on the display a list of contacts most closely-associated with the selected contact, wherein the list of contacts is selected from the plurality of person profiles, and the most closely-associated contacts are determined using the relevancy ranking, and further present to the user on the display multiple options for communicating with the selected contact, each of the options ranked in order based on frequency of use in prior communications between the user and the selected contact.

13. The system of claim 12, wherein the presenting comprises displaying each of the first and second sets of contacts in a respective horizontal row for viewing on the same screen by the user.

14. The system of claim 13, wherein a touch screen interface displays the same screen, and the instructions are further configured to instruct the at least one processor to enable the user to scroll contacts in the respective horizontal row in a left or right direction using the touch screen interface.

15. The system of claim 12, further comprising a database storing the plurality of person profiles.

* * * * *